Jan. 27, 1970    H. B. SCHULTZ    3,491,701
PUMP CONSTRUCTION
Filed Sept. 13, 1968
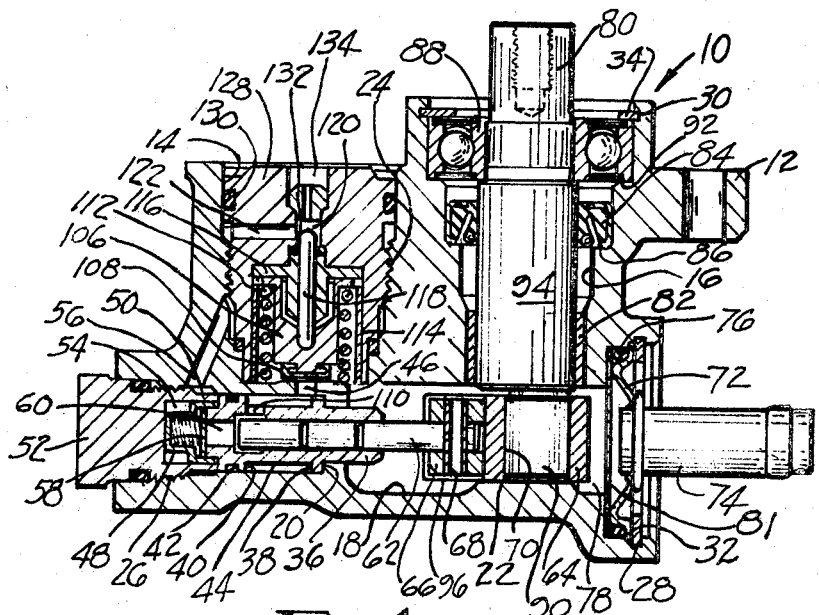
Fig. 1
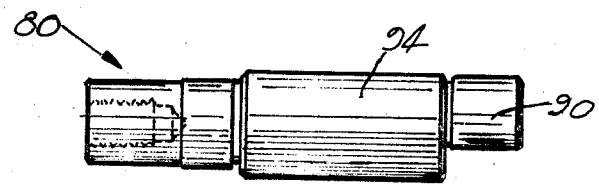
Fig. 2
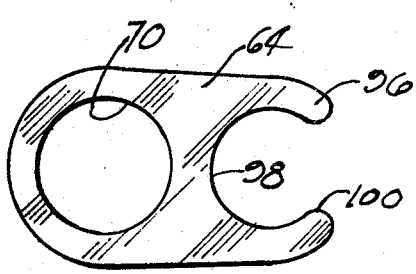
Fig. 3
Fig. 4
INVENTOR.
HAROLD B. SCHULTZ
BY
Richard H. Geib
ATTORNEY

United States Patent Office 3,491,701
Patented Jan. 27, 1970

3,491,701
PUMP CONSTRUCTION
Harold B. Schultz, South Bend, Ind., assignor to The Bendix Corporation, a corporation of Delaware
Filed Sept. 13, 1968, Ser. No. 759,576
Int. Cl. F04b 21/08, 19/22; F16k 27/00
U.S. Cl. 103—153                                    8 Claims

ABSTRACT OF THE DISCLOSURE

A pump means utilizing a porous metal link between a revolving shaft eccentric and a connecting pin for a reciprocating plunger, the latter two elements of hard metal to increase life of operation within low-lubricity, and even water carrying liquids.

SUMMARY

It has been observed that when simplifying a pump means for the development of hydraulic pressure for utilization in an automotive brake system, for example, that the prior art constructions only considered pumping liquids having good lubricating qualities, such as mineral oil. It has been found that brake fluid cannot be pumped by such constructions without the use of expensive bearings or the like. This would, if not for this invention, render the hydraulic power brake systems for vehicles questionable in view of expense.

A principal object of this invention is to provide materials of construction which will permit high speed pumping of brake fluid even with a high level of water content. More particularly, it is a detailed object of this invention to employ a porous metal in a connecting link between a shaft and a reciprocating plunger.

An additional object of this invention is to incorporate a pressure regulating means which in addition to controlling inlet flow to a pumping cylinder removes the pressure discharge port of the pump means from a direct opening to a discharge chamber of the pumping cylinder.

DRAWING DESCRIPTION

Other objects and advantages of this invention will most certainly occur to those skilled in the art to which this invention relates from a description of the drawings in which:

FIGURE 1 is a cross sectioned view of a hydraulic pump means in which the improvements of this invention have been found to be particularly advantageous;

FIGURE 2 is a side view of a shaft for the pump means in FIGURE 1;

FIGURE 3 is a plan view of a porous metal link in accordance with this invention; and FIGURE 4 is a cross-sectional view of a pin means pivotally affixing the link and a plunger of the pump means.

DETAILED DESCRIPTION

For some time now, full power hydraulic braking systems have been the object of much attention within the braking industry for automotive vehicles. The obvious advantages of unlimited displacement with the ever increasing need to provide maximum braking effectiveness would appear to be within the skill of the art at this time with such systems. Such a system is shown in U.S. patent application Ser. No. 603,851 incorporating a brake control valve operated by a brake pedal via a push rod connecting link therebetween. This valve is supplied with fluid pressure from a pair of accumulators, which are independently pressurized by the two pumps such as pump 10 of this invention. In order to insure an adequate fluid supply, separate reservoirs are suggested for each separate section of the braking system.

Many different approaches as to the design of pump 10 have been tried by various manufacturers such as ported induction schemes and/or pressure responsive inlet control valves for the pumps. In the realization of the need to simplify the pumping mechanism by eliminating the number of parts and the unnecessary moving parts, it has been observed that the most likely successful pumping means will be with respect to those designs incorporating pressure responsive inlet valves for terminating the supply of hydraulic fluid to the pumping chamber, whenever the predetermined pressure has been reached and is being maintained in the accumulator. Such a pump would take on the design characteristics wherein a simple housing 12 is formed of cast iron and tin plated to have bores 14, 16 and 18. Bore 18 is machined to provide a shoulder 20 and a boss 22 and the appropriate means for mounting elements therein such as threaded portions 24 and 26 and the grooves 28 and 30 for snap rings 32 and 34.

A pumping cylinder block 36 is assembled from the left end of bore 18 to have a flange 38 abutting the shoulder 20. Block 36 has another flange 40 with a seal 42 cooperating with bore 18 to provide an inlet chamber 44 open by passage 46 to bore 14. Over the end of block 36 a split discharge valve retainer 48 is held by sleeve 50 of plug 52 closing the left end of bore 18 to prescribe a discharge pressure chamber 54. Chamber 54 is communicated by diagonal passage 56 in housing 12 to bore 14 adjacent the inner end of the threads 24. A spring biased disc valve 58 comprises the discharge valve for pumping chamber 60 in the block 36.

A reciprocating plunger 62, which has been preassembled to a link 64 by a pin 66 and a split hollow pin 68, permitting slight misalignment of squareness of plunger 62 with shaft 94 and pin 68, is inserted from the right end of bore 18 within the cylinder block until opening 70 (see FIGURE 3) overlies the boss 22 of bore 18. This then completes the assembly in bore 18 except for the cap 72 and its fluid supply pipe 74 which is assembled with a seal 76 sealing reservoir cavity 78, as by the snap ring 32. Prior to this closing, however, it is desirable to assemble a pump shaft 80 in the bore 16, and place a filtering screen 81 over the opening of cavity 78.

The first step in this operation is to carefully press fit babbit bearing 82 to the housing to lie adjacent the opening of bore 16 into bore 18. Then a seal assembly 84 is press fitted against a shoulder 86 of bore 16. The shaft 80 is preassembled with an end thrust bearing 88 and then inserted into bore 16 while aligning its eccentric 90 with opening 70 of link 64 until it lightly rests on boss 22. During this assembly bearing 88 is press fitted to housing 12 to rest on shoulder 92 of bore 16, and reservoir cavity 78 is sealed as respects bore 16 by the seal assembly 84 on the intermediate portion 94 of shaft 80.

Within bore 14 is provided an inlet control valve mechanism. This mechanism comprises a valve body 106 having an annular resilient valve seat 108 on its lowermost end for cooperation with an inlet port 46 drilled in the housing body to communicate reservoir 78 with the annular space 44 about the pumping cylinder 36 between it and the housing 12. The annular space 44 is communicated via an inlet port 110 in the cylinder 36 to the pumping chamber 60 ahead of the piston or plunger, as it may be termed, 62. The valve body is urged upwardly away from the inlet 46 by means of spring 112. About the spring a sleeve 114 is fitted. Over this, a seal retainer body 116 is placed, which retainer slidably receives a plunger 118 connected at its lowermost end with the body 106. Plunger 118 extends upwardly into a chamber 120 provided by a cross-drilled passage 122 in plug 128 threadedly assembled within the bore 14 with a seal 130 to locate the valve mechanism and seal the bore. However, prior to the assembly of the plug 128, an O-ring seal 132 may be placed over the retainer 120 or fitted within the stepped bore in the plug 128 to seal with the surface of the plunger 122 and maintain, therefore, the integrity of the chamber 124.

Passage 56 provided in the housing 12 communicated chamber 60 within which pump discharge pressure is present to the cross-drilled passage 122 in the plug 128. It should be realized by those skilled in the art that this passage 56 opens to the threaded area on one side thereof of the plug 128. This side of the threaded area of the plug 128 may be notched in order to insure fluid communication to the passage 122 from the passage 56. Also, it is visualized that with adequate tolerance control in manufacturing the notches within this side of the threads of the plug 128 may be eliminated to provide a spiral fluid passage which would have the effect of damping the pulsations from the pumping chamber 60 discharged past the flapper valve 58 on each cycle of the piston or plunger 62, as it is delivered from the port 134.

As seen in FIGURE 3 the link 64 is also provided with a forked end 96 having a circular cavity 98 opened along a chord 100 of lesser dimension than the diameter of the cavity 98 to retain pin 66 while permitting arcuate motion of the link 64.

The configuration shown in the pump design enables not only the simplification of structure to convert rotary pump shaft motion into reciprocating motion necessary for a piston pump but as well the elimination of expensive bearings and the utilization of brake fluid for a high speed pump. More particularly, the powdered metal link, which by the way was chosen to be compounded of carbon, iron, copper and acid insolubles, 0.050–0.090; 92.0; 4.0–5.0 and 1.0 percent by weight respectively, enables easy design flexibility as well as the obtaining of a combination of a hard metal shaft and pin with a link of sufficient hardness but more importantly porosity to trap liquid and provide a very effective bearing combination with the hard metal parts. The poor lubricity of brake fluids can be discarded because of the porous nature of link 64 which makes up for the insufficiencies of the wetting ability of the brake fluid.

Having fully described a manner of construction for the structure of my invention and its functional advantages when so constructed, it is now desired to set forth the intended protection sought by these Letters Patent in the appended claims.

I claim:

1. In a pump having a rotating shaft for driving a reciprocating plunger, a connecting means for the shaft and plunger, said connecting means comprising:
    a powdered metal link connected to an eccentric portion of the shaft, which eccentric portion is formed of a harder, non-porous finish steel, said link having an elongated form with a bore therethrough open on a chord of less dimension than the diameter of the bore at one end of said link; and
    connecting pin means of hard, non-porous finish in said bore of said link completing said connecting means.

2. The structure of claim 1 wherein said connecting means is within a reservoir chamber of low-lubricity liquid such that the pores of said powdered metal link trap said liquid between said link and both said eccentric portion and said connecting pin means.

3. A pump comprising:
    a housing having a through bore with at least one open ended bore at right angles to said through bore, said housing having a bearing boss in said through bore underlying said open ended bore;
    pump means in said through bore including valve means and a cylinder abuttingly held on a shoulder in said through bore from one end thereof to close one end of said through bore;
    a reciprocating plunger and link means insertable from the other end of said bore until said plunger is within said cylinder and an opening in said link means overlies said boss, said link means being of a porous metal;
    a shaft means having a hard, non-porous, eccentric portion insertable in the open ended bore with said eccentric portion passing through the opening of said link to rest on said boss, said shaft means having spaced bearing supports in said open-ended bore with seal means to seal the open ended bore; and
    closure means for the other end of said through bore including a fluid supply means for a chamber around said plunger and link means in the flow path to said cylinder to provide liquid to pores of said link whereby low-lubricity fluids can be used to lubricate the connection of said shaft and said link.

4. The structure of claim 3 wherein said link is further characterized as a powdered metal structure comprised of carbon, iron, copper and acid insolubles.

5. The structure of claim 4 wherein said link is still further characterized as having a forked end with a circular cavity open on a chordal dimension less than its diameter, which cavity receives a non-porous metal pin that mounts said plunger to unite said link and said plunger such that said link can move in an arc with respect to said plunger.

6. The structure of claim 3 wherein said housing is provided with a second open ended bore in which is mounted a pressure regulating device to be interposed in said flow path, and which is provided with fluid discharge means arranged to control said pressure regulating device and port pressurized fluid from said pump.

7. The structure of claim 3 wherein said link means includes a split hollow pin to permit slight misalignment of squareness between said plunger, said shaft and said hollow pin.

8. The structure of claim 3 wherein said seal means is located between said spaced bearing supports.

References Cited

UNITED STATES PATENTS

| | | | |
|---|---|---|---|
| 1,789,714 | 1/1931 | Short. | |
| 1,834,746 | 12/1931 | Short. | |
| 2,093,800 | 9/1937 | May. | |
| 2,503,907 | 4/1950 | Hefler | 103—153 |
| 3,265,007 | 8/1966 | Schultz | 103—153 |
| 3,312,169 | 4/1967 | Schultz | 103—153 |

HENRY F. RADUAZO, Primary Examiner

U.S. Cl. X.R.

103—216; 308—238